May 28, 1940.  G. A. GOEPFRICH  2,201,999
BRAKE
Filed Dec. 29, 1937
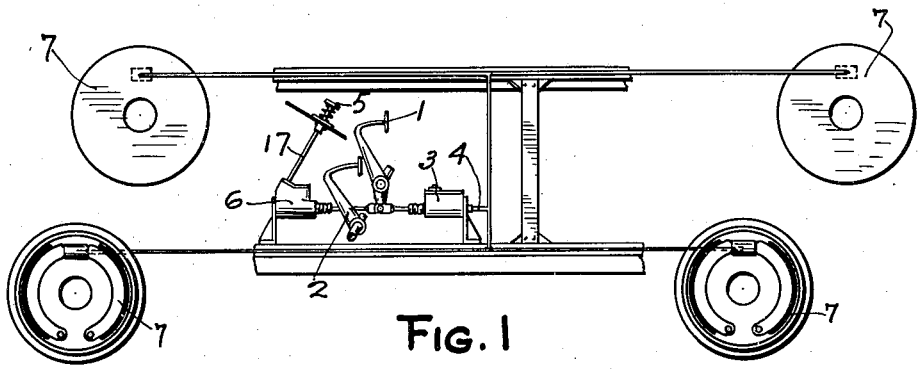
Fig. 1
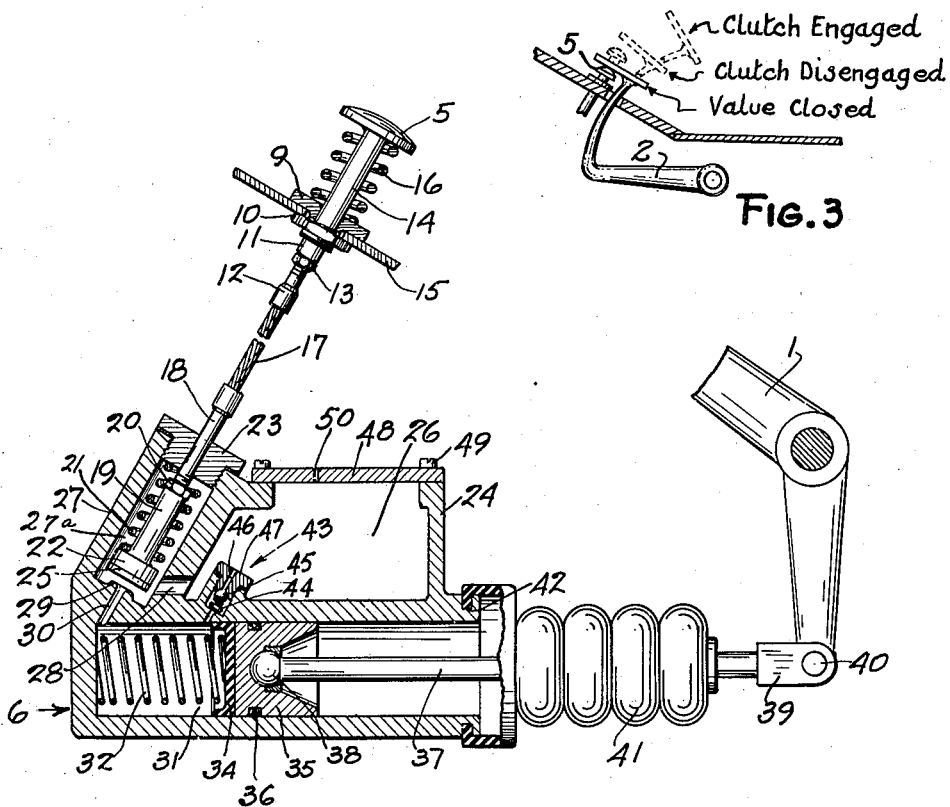
Fig. 3
Fig. 2
INVENTOR,
GEORGE A. GOEPFRICH
BY Jerome R. Cox
ATTORNEY.

Patented May 28, 1940

2,201,999

UNITED STATES PATENT OFFICE 2,201,999

BRAKE

George A. Goepfrich, South Bend, Ind., assignor to Bendix Products Corporation, South Bend, Ind., a corporation of Indiana Application December 29, 1937, Serial No. 182,187

2 Claims. (Cl. 192—13)

This invention relates to brakes and more particularly to brake control mechanisms.

An object of the invention is to provide a brake control mechanism whereby the brake may be held in the applied position by a secondary brake controlling means apart from the brake pedal, thus allowing the driver to use the foot normally used to apply the brake for any other desired purpose. This arrangement is sometimes called a "hill holder" being especially useful on a hill.

A further object of the invention is to provide a secondary brake control separate from, but to be released in synchronism with the engagement of the clutch, the same foot controlling both, the operation of the secondary brake controlling means being optional.

A further object of the invention is to provide a secondary brake control whereby the brake may be further applied without releasing the applying means of the secondary brake controlling means.

A feature of the invention is a novel fluid cylinder, preferably hydraulic as illustrated, allowing the brake to be locked at any one of an infinite number of positions.

The above and further objects and features will be evident from the following description and claims.

I have illustrated my invention by a drawing, of which:

Figure 1 is a diagrammatic view of the brake applying means together with the secondary brake controlling means;

Figure 2 is an enlarged view in vertical section of the secondary brake controlling means; and Figure 3 is a diagrammatic sectional view showing the relation of clutch operation to the operation of the brake lock.

In Figure 1 is illustrated a hookup embodying the invention, comprising a brake pedal 1 which actuates a hydraulic master brake cylinder 3, which in turn forces hydraulic brake fluid through an outlet 4 to actuate brakes 7. Adjacent to a clutch pedal 2 and in such a position so as to be easily accessible to the foot operating the clutch pedal 2 is a push button 5 arranged to operate a secondary brake control cylinder 6 through a cable 17.

The structure of the secondary brake control is more clearly shown in Figure 2 and consists of the button 5 with a stem confined in a guide 9 held in place in the floor board by the clamp nut 10. The button 5 is provided with an inside thread at end 11 so as to receive a cable end 12 which is held fixed in the shank of button 5 by a check nut 13. A spring 16 holds the button 5 in released position. The cable end 12 is secured to one end of a cable 17.

The cable 17 is attached by means of a cable end 18 to a valve stem 19 which is held fixed relative to the cable end 18 by the check nut 20. A spring 21 rests at one end against a shoulder formed on the valve stem 19 and at the other end on a cap 23 screwed into a housing 27 formed on the cylinder body 24. On one end of the valve stem 19 there is vulcanized a rubber seal 25 to close a port 30 formed in the valve seat 29 the port being arranged to connect the valve chamber 27a with a fluid cylinder 31.

I provide a reservoir 26 connected to the valve chamber 27a by an inlet port 28. In the fluid cylinder 31 are the spring 32, the rubber piston cup 34, the piston 35, and the secondary piston packing 36 provided to prevent air from entering the cylinder 31.

The entire unit is attached to the brake pedal 1 by a rod 37 fastened at one end to the piston 35 by a ball joint 38 and at the other end to the brake pedal 1 by a yoke 39 and pin 40. To regulate the fluid flow from the reservoir 26 to the cylinder 31, when the port 30 is closed, is a check valve 43 consisting of a spring 44 and a ball 45. The ball closes a port 46 in a plug 47 allowing the fluid to flow in one direction only, that is from the reservoir 26 to the cylinder 31.

The cylinder 31 is kept free from dirt by a boot 41 secured, at one end, in a recess 42 on the housing 24 and at the other end to the rod 37. The reservoir 26 is provided with a cover plate 48 secured by means of screws 49. The reservoir 26 is further provided with an air vent 50 in the plate 48 which may or may not be provided with an air cleaner.

In operation when the brake is applied by means of the brake pedal 1 and thereafter the button 5 is depressed together with the clutch pedal, the spring 16 is compressed and the tension thereof removed from the cable 17. Thereupon the spring 21 moves the valve stem 19 downward closing the port 30, trapping the fluid in the cylinder 31 and consequently keeping the brake applied as long as the pedal 5 is depressed. The brake may be further applied if desired. Further application draws fluid into the cylinder 31 through the check valve 43. The brake is held applied until the pressure on pedal 5 is released, whereby the pressure of the spring 16 acts through the shaft 14 and cable 17 and moves the rubber seal 25 from the valve seat 29, allowing the fluid to flow through the ports 30 and 28 into the reservoir 26, thus allowing the brake to be released.

It is to be understood that the detail description above is for illustration only and is not intended to limit the scope of the invention.

I claim:

1. In a brake control mechanism, a primary brake controlling means and a secondary brake controlling means for holding the primary brake controlling means applied, said secondary means comprising a fluid control having a cylinder, a piston in said cylinder, a reservoir connected to said cylinder, a valve for shutting off flow between said reservoir and said cylinder, a spring for moving said valve to open position, a foot pedal, means controlled by said pedal for closing said valve against said spring, and a check valve that allows fluid to flow from said reservoir to said cylinder.

2. In a brake control mechanism, a primary controlling means and a secondary brake controlling means for holding the primary brake control means applied, said secondary means comprising a fluid control having a cylinder, a piston in said cylinder, a reservoir connected to said cylinder, a valve for shutting off flow between said reservoir and said cylinder, a spring for moving said valve to open position, a foot pedal, means controlled by said pedal for closing said valve against said spring, and a check valve that allows fluid to flow from said reservoir to said cylinder, said secondary brake pedal being so arranged relative to the clutch pedal that both said clutch pedal and said secondary control pedal may be depressed or released together synchronizing the engagement of said clutch with the release of the brakes, the operation of said secondary brake control pedal however being optional.

GEORGE A. GOEPFRICH.